W. G. DE VANE.
GRIP SHOE FOR VEHICLE TIRES.
APPLICATION FILED AUG. 23, 1920.
1,397,406.
Patented Nov. 15, 1921.
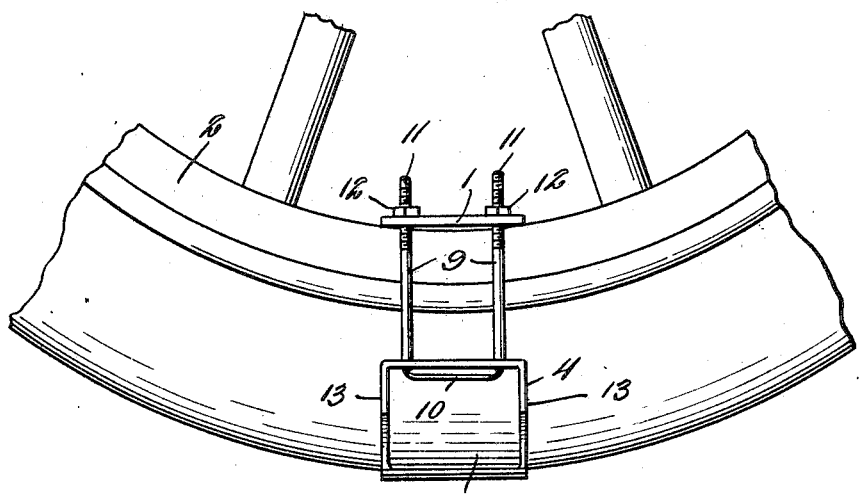
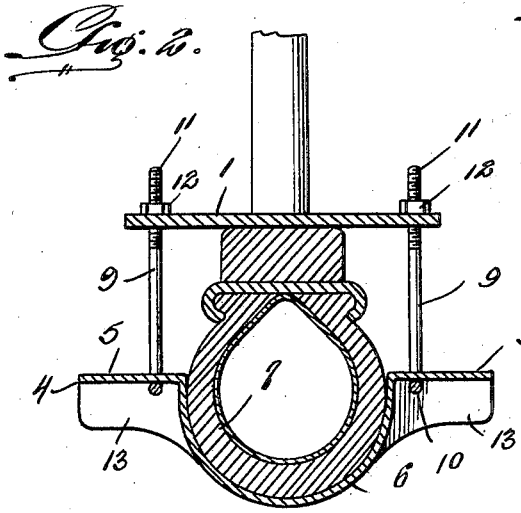
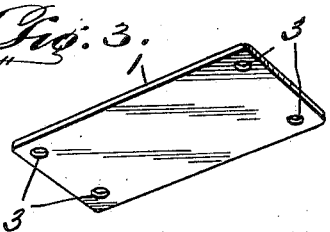
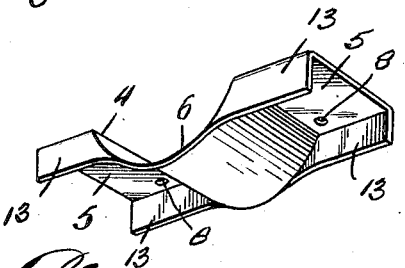

UNITED STATES PATENT OFFICE.

WILLIAM G. DE VANE, OF TRILBY, FLORIDA.

GRIP-SHOE FOR VEHICLE-TIRES.

1,397,406.  Specification of Letters Patent.  Patented Nov. 15, 1921.

Application filed August 23, 1920. Serial No. 405,281.

*To all whom it may concern:*

Be it known that I, WILLIAM G. DE VANE, a citizen of the United States, residing at Trilby, in the county of Pasco and State of Florida, have invented new and useful Improvements in Grip-Shoes for Vehicle-Tires, of which the following is a specification.

This invention relates to a grip shoe for vehicle tires, the primary object of the invention being to provide a device of this character, a plurality of which may be readily attached to an automobile wheel, for the purpose of preventing the wheel from sinking into mud, sand or other like soft ground, and by means of which a gripping action on the ground may be obtained to prevent the wheel from slipping and becoming mired in the soft soil.

A further object of the invention is to provide gripping shoes for automobiles and like vehicles which are readily detachable after use, and which may be easily and conveniently applied to the rear wheels of a mired vehicle for the purpose of enabling the vehicle to extricate itself from the soft or shifting soil.

A still further object of the invention is to provide a grip shoe embodying a shoe proper which may be inexpensively stamped out of sheet metal, and a fastening means for the shoe which will securely hold it in position against displacement or shifting movements, the said shoe being provided with reinforcing flanges which also act as grippers to enable a firm grip upon the soil to be obtained.

The invention consists of the features of construction, combination and arrangement of parts, hereinafter fully described and claimed, reference being had to the accompanying drawing, in which:—

Figure 1 is a side elevation of a section of an automobile wheel and tire, with my improved grip shoe applied thereto.

Fig. 2 is a cross section through the tire and shoe.

Fig. 3 is a perspective view of the bracket plate.

Fig. 4 is a similar view of the shoe *per se*.

Referring to the drawing, 1 designates a bracket plate which is extended transversely across the inner side of the wheel felly 2, said bracket plate extending beyond opposite sides of said felly and having each of its end portions provided with a pair of transversely alined openings 3. A shown, the bracket plate 1 is of oblong rectangular form and flat, and is made in practice of more or less resilient sheet metal of the required thickness and strength.

The shoe 4 comprises a plate of greater length and approximately of the same width as the bracket plate 1. This shoe is provided with flattened end portions 5, arranged in parallel relation to the end portions of the bracket plate 1, and a central semi-circular depressed portion 6, which semi-circular depressed portion 6 is adapted to receive and embrace the tread portion and sides of the tire 7. The shoe 4 is arranged transversely of the tire and in alinement with the bracket plate 1 and the end portions 5 of the bracket plate are provided with transversely alined openings 8 which coincide in position with the openings 3 in the ends of the bracket plate 1.

The respective ends of the bracket plate and shoe are connected on opposite sides of the tire by U-bolts 9. The shanks of these bolts extend between and pass through the registering openings 3 and 8 of the bracket plate and shoe at the opposite sides, the cross portion 10 of each U-bolt extending transversely outside the flattened end portion 5 of the shoe with which said bolt is connected, while the inner or free ends of the bolt shanks are threaded, as at 11 and provided with securing nuts 12 bearing on the bracket plate 1, whereby the parts are detachably held together.

By the construction described a type of shoe is provided which dispenses with the use of securing chains and other complicated and bunglesome fasteners, and which employs a simple and convenient form of fastening means by which the parts may be readily and conveniently coupled for attachment to the wheel and uncoupled for removal therefrom. By the described arrangement of the bolts 9, the shanks of which lie one in rear of the other in the direction of rotation of the wheel, and the cross portions of which extend transversely of and outside the end portions 5 of the grip shoe 4, a very strong and effective type of fastening is provided, since the spaced bolt shanks are not only attached to the ends of the bracket plate and shoe on opposite sides of their longitudinal centers, whereby a double type of connection is afforded, but are also so arranged that the shanks mutually resist any tendency to twisting motion, hence the grip shoe will be held accurately in position on the wheel and prevented from sluing or oscillating as the result of any unequal pressures which may fall at different times upon the opposite ends of the shoe, due to the engagement by the end gripping portions of the shoe of portions of the soil of different rigidity, as will be readily understood.

In practice any desired number of shoes may be placed upon the vehicle wheel. Ordinarily, when the vehicle is mired in mud, sand, or other soft or shifting soil, three grippers applied at equidistant points upon each of the three wheels of the vehicle will be found sufficient for use in affording the desired additional traction to prevent the wheels from slipping and to enable the vehicle to extricate itself under its own power. As shown, the shoe 4 has its end portions 5 provided along its longitudinal front and side edges with flanges 13. These flanges extend between the lateral extremities of the portions 5 and the adjacent sides of the depressed portion 6 and act as reinforcements to give the desired strength and rigidity to the shoe to resist distortion. Said flanges furthermore serve as grip elements to engage the soil at opposite sides of the wheel, so that while the tire and depressed portion 6 may move in the rut formed by the wheel the flanges 13 will engage the ground at opposite sides of the wheel, whereby the wheel will be prevented from digging itself through into the soil and the necessary traction is afforded for the progress of the vehicle.

It will be observed that the bracket plate and grip shoe are of effective but very simple construction, and may be made conveniently by stamping them out of sheet metal, and that by the construction described the use of complex parts liable to rust, to become loose or detached, or which are difficult to apply and remove, are entirely dispensed with, thus enabling the device to be easily applied and detached and to be manufactured and sold at a comparatively low cost. It will, of course, be understood that the shoe may be made in different sizes according to the size of the tire to which it is to be applied.

Having thus fully described my invention, I claim:—

A grip shoe for vehicle tires comprising a relatively wide body having a semi-circular concave portion intermediate its ends of such size as to snugly receive the tire of the vehicle, the inner surface of said concave portion being smooth, the ends of said body constituting wings inwardly of the widest portion of the tire, flanges at the longitudinal edges of said wings extending outwardly therefrom, the said flanges being relatively shallow for the greater part of their length and being of increased depth as they approach the concave portion, the said flanges joining the concave portion at the sides and well above the tread portions thereof, the outer surface of the shoe being otherwise smooth and unobstructed, and means for securing said shoe upon the tire.

In testimony whereof I affix my signature.

WILLIAM G. DE VANE, M. D.